United States Patent [19]

Takahashi

[11] Patent Number: 4,823,343
[45] Date of Patent: Apr. 18, 1989

[54] DIAGNOSTIC SYSTEM FOR REMOTE COMPUTERS

[75] Inventor: Etsuo Takahashi, Tokyo, Japan
[73] Assignee: NEC Corporation, Tokyo, Japan
[21] Appl. No.: 165,166
[22] Filed: Mar. 7, 1988
[30] Foreign Application Priority Data Mar. 6, 1987 [JP] Japan .................................. 62-50376

[51] Int. Cl.⁴ ............................................. G06F 11/00
[52] U.S. Cl. ................................ 371/16; 324/73 AT; 364/200; 371/20; 371/25
[58] Field of Search ....................... 371/15, 25, 16, 20; 324/73 R, 73 AT; 364/200 MS File

[56] References Cited

U.S. PATENT DOCUMENTS 4,654,852 3/1987 Bentley et al. ........................ 371/29

Primary Examiner—Jerry Smith
Assistant Examiner—Stephen M. Baker
Attorney, Agent, or Firm—Foley & Lardner, Schwartz, Jeffery, Schwaab, Mack, Blumenthal & Evans

[57] ABSTRACT

A diagnostic system comprises a plurlity of remote computers connected to a switched telephone network to which a diagnostic center and an adminstrator's station are also connected. The diagnostic center includes a data processor for preparing a diagnostic file for each of the remote computers and storing it into a first memory. Each diagnostic file contains a remote computer's identification, a remote computer's telephone number, diagnostic commands, expectation values and an administrator's telephone number. The center transfers files from the first memory to a second memory and sequentially recalls data in each file in the second memory. The center first sends dialing information to the network according to the recalled computer's telephone number to establish a first path to a computer identified by the recalled identification and then sends out test signals according to the recalled diagnostic commands to the identified computer to detect responses from it. If there is a match between each response and each recalled expectation value, the first path is released and a new path is established to the next remote computer. If there is a mismatch, the first path is released and a second path is established to the administrator's station and contents of the mismatch and the recalled identification are sent to the administrator's station to notify abnormalities.

3 Claims, 2 Drawing Sheets

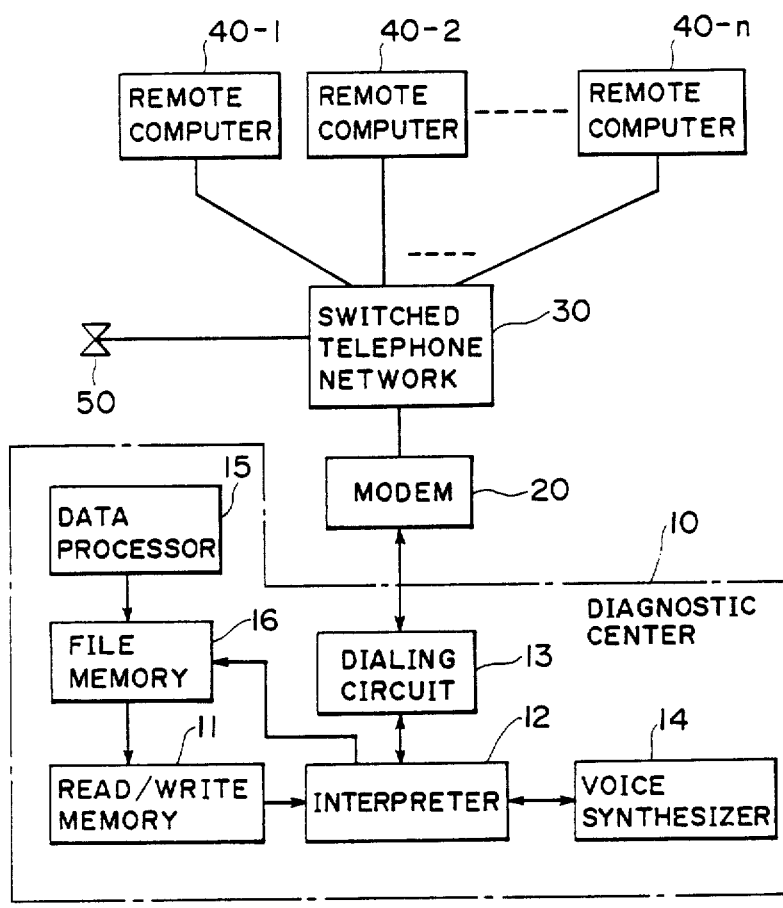

DIAGNOSTIC SYSTEM FOR REMOTE COMPUTERS

BACKGROUND OF THE INVENTION

The present invention relates generally to communications systems, and more specifically to a diagnostic system in which remote stations, or computers are interconnected by a switched telephone network and remotely diagnosed from a diagnostic center.

Hitherto, remote computers are remotely diagnosed from a diagnostic center through a switched telephone network using a diagnostic program stored in a memory. The program includes a list of diagnostic items or commands for each of the remote computers. The commands are sequentially executed to diagnose the operating characteristics of a remote computer to check for the presence of abnormalities. The results of the diagnosis are indicated in printouts in the diagnostic center. However, the contents of the diagnostic items and the relationships between the diagnostic items and the remote computers are determined by manufacturer using an operating program and cannot be altered by users. Therefore, whenever a change is to be made in the system, an expert must be called upon to alter the contents of the memory. In addition, a system administrator must make frequent trips to the diagnostic center to check the printouts for any abnormalities.

SUMMARY OF THE INVENTION

It is therefore an object of the present invention to provide a flexible diagnostic system which allows users to alter the contents of diagnostic files to meet changing diagnostic needs and create new diagnostic files to meet growing numbers of remote stations and which eliminates the need for a system administrator to make trips to the diagnostic center.

Specifically, the diagnostic system of the present invention comprises a plurality of remote computers connected to a switched telephone network to which a diagnostic center and an administrator's station are also connected. The diagnostic center includes a data processor with a user-operated keyboard for preparing diagnostic files respectively for the remote computers and storing the prepared diagnostic files into a first memory. Each diagnostic file contains a remote computer's identification, a remote computer's telephone number, a diagnostic command, an expectation value and an administrator's telephone number. The diagnostic files are transferred from the first memory to a second memory which is then addressed to sequentially recall data contained in the addressed file. Dialing information is first sent to the switched telephone network in accordance with the recalled remote computer's telephone number to cause the network to establish a first path from the center to the remote computer identified by the recalled remote computer identification. The recalled diagnostic commands are executed by applying a test signal to the first path to detect a response from the identified remote computer and detecting whether there is a match or a mismatch between the response and the recalled expectation value. If a match is detected, the first path is disconnected and the process is repeated to diagnose the next computer. If a mismatch is detected, the first path is released and dialing information is sent to the switched telephone network according to the recalled administrator's telephone number to cause the network to establish a second path from the center to the administrator's station. Contents of the mismatch and the recalled identification are sent from the center to the administrator's station through the second path to notify abnormalities, whereby the administrator is not required to make trips to the diagnostic center to monitor abnormalies in the remote computers. Whenever a change is to be made in an old diagnostic file or a new remote computer is to be added to the system, the user at the diagnostic center prepares a new diagnostic file to substitute it for the old diagnostic file or store it into the first memory for the newly added remote computer.

BRIEF DESCRIPTION OF THE DRAWINGS

The present invention will be described in further detail with reference to the accompanying drawings, in which:

FIG. 1 is a block diagram of a communication system of the present invention;

FIG. 2 is an illustration of a portion of diagnostic files contained in the memory of FIG. 1.

DETAILED DESCRIPTION

Figure 3:
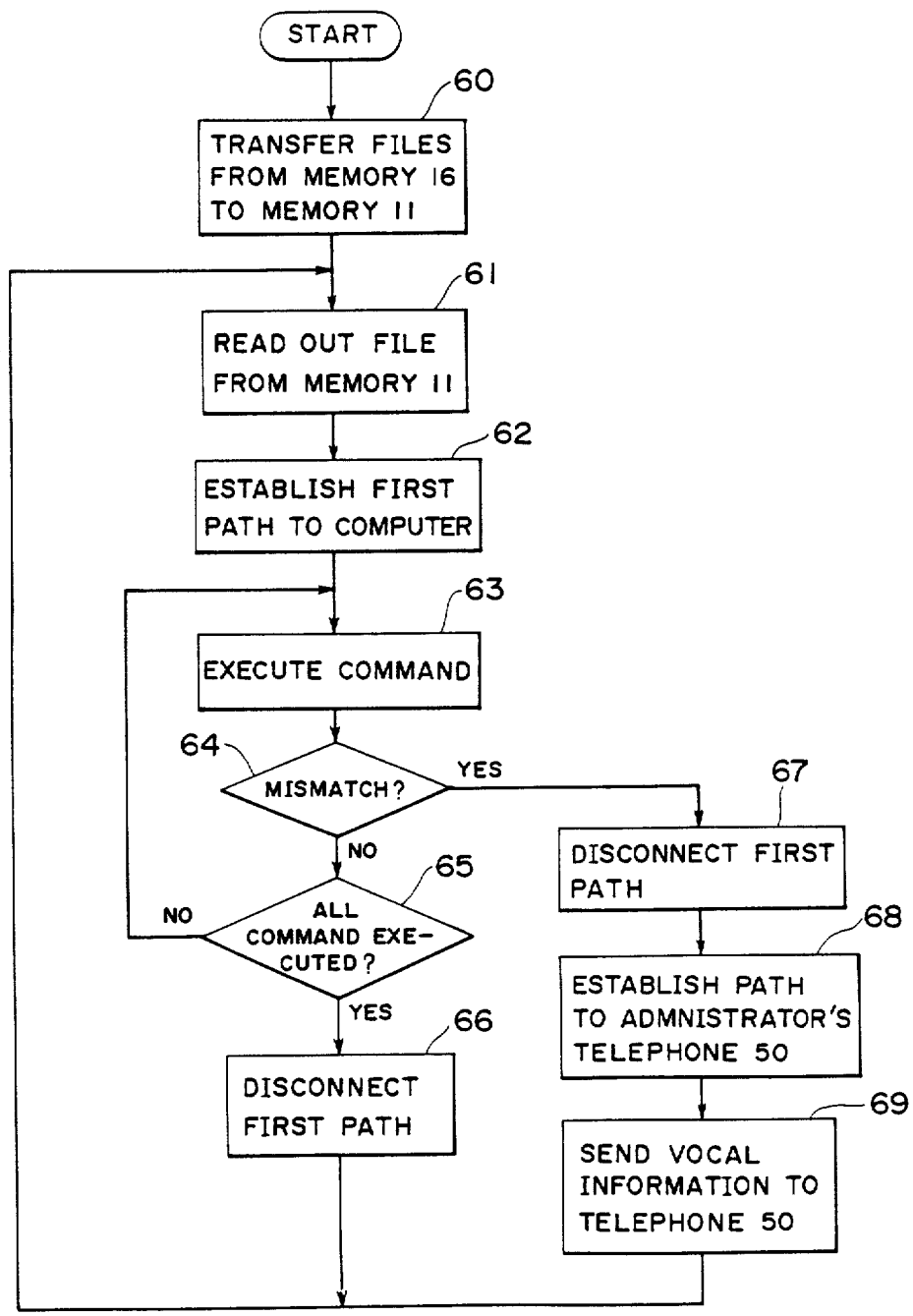
FIG. 3 is a flowchart describing the operation of the diagnostic center.

As represented in FIG. 1, a diagnostic system of the invention comprises a diagnostic center 10 connected through a modem 20 to a switched telephone network 30 by way of which the diagnostic center 10 have access to any of remote stations, or computers 40-1 through 40-n and to a system administrator's telephone 50. The diagnostic center 10 includes a data processor 15 for preparing a diagnostic file for each of the remote computers using a user-operated keyboard, not shown, and storing the prepared files into a file memory 16. As illustrated in FIG. 2, each diagnostic file contains a remote computer's identification, a remote computer's telephone number, diagnostic commands, expectation values or allowable limits corresponding respectively to the diagnostic commands, and an administrator's telephone number. The prepared diagnostic files are stored into a read/write memory 11.

An interpreter 12 is connected to the file memory 16 and read/write memory 11. A flowchart shown in FIG. 3 describes a series of programmed operations to be performed by an interpreter 12. The program starts with operations block 60 which directs the transferring of diagnostic files from the file memory 16 to the read/write memory 11. Exit then is to operations block 61 which directs the reading of a first one of the diagnostic files out of the read/write memory 11 into a register to sequentially recall data contained therein. Control proceeds to operations block 62 which directs the applying of the recalled remote computer's telephone number to a dialing circuit 13 which in turn sends out corresponding dialing information to the switched network to establish a first connection from the center to the remote computer 40 which is identified by the recalled remote computer's identification. Exit then is to operations block 63 which directs the sending of a test signal according to a first one of the recalled diagnostic commands to the switched network to detect a response from the identified remote computer. Exit is to decision block 64 which checks for the presence of a mismatch between the response and a corresponding one of the recalled expectation values or checks to see if the response falls within the recalled allowable limits. If an abnormal condition is not detected with respect to a given diagnostic command, block 64 will yield a negative answer and control proceeds to decision block 65 which checks to see if all the diagnostic commands are executed. If the answer is negative, control returns to block 63 to diagnose the next diagnostic command. If abnormalies are not detected in the identified remote computer with respect to all the diagnostic commands, control proceeds to operations block 66 which directs the releasing of the connection to the remote computer which has been diagnosed. Control returns to operations block 61 to diagnose the next remote computer.

If an abnormaly exists in a remote computer, block 64 will yield an affirmative answer and control exits to operations block 67 which directs the releasing of the first connection and proceeds to operations block 68 which directs the applying of the recalled administrator's telephone number to the dialing circuit 13 to send a ringing signal to the telephone 50 and establish a second connection when it goes off-hook. Exit then is to operations block 69 in which the contents of the mismatch are applied to a voice synthesizer 14 from which translated vocal information is sent to the administrator's telephone 50 to notify it of an abnormality of a remote computer and its identification. Upon execution of block 69, control returns to block 61 to repeat the above process until all the remote computers are diagnosed.

Thus, the system administrator is not required to make frequent trips to the diagnostic center 10 to check the contents of printouts on which the results of the diagnostics have hitherto been indicated.

Because of the use of the data processor 15 and file memory 16, the contents of each diagnostic file can be altered by the users to add or delete commands. In addition, diagnostic files can be easily added to or deleted from the file memory to meet changing remote computers.

What is claimed is:

1. A diagnostic system comprising:
    a switched telephone network;
    a plurality of remote computers connected to said switched telephone network;
    an administrator's station connected to said switched telephone network; and
    a diagnostic center connected to said switched telephone network, said diagnostic center comprising:
        a first memory;
        means for preparing diagnostic files respectively for said remote computers and storing said files into said file memory, each of said diagnostic files including a diagnostic command, an expectation value, a remote computer's identification, a remote computer's telephone number and an administrator's telephone number;
        a second memory;
        means for transferring the diagnostic files from said first memory to said second memory, addressing one of the diagnostic files in said second memory to recall data contained in the addressed file, sending dialing information to said network according to the recalled remote computer's telephone number to cause the network to establish a first path from said center to the remote computer identified by the recalled remote computer's identification, applying a test signal to said first path according to said recalled diagnostic command to detect a response from said identified remote computer, detecting a mismatch between said response and the recalled expectation value and releasing said first path and sending dialing information to said network according to the recalled administrator's telephone number to cause the network to establish a second path from said center to said administrator's station; and
        means for transmitting contents of said mismatch and said recalled remote computer's identification to said administrator's station through said second path.

2. A diagnostic system as claimed in claim 1, wherein said administrator's station is a telephone set and said transmitting means comprises a voice synthesizer for converting contents of said mismatch into a vocal output and transmitting the vocal output to said administrator's telephone set.

3. A method for diagnosing a plurality of remote computers connected to a switched telephone network to which an administrator's station is also connected comprising:
    (a) preparing a plurality of diagnostic files each including a diagnostic command, an expectation value, a remote computer's identification, a remote computer's telephone number and an administrator's telephone number and storing said diagnostic files into a first memory;
    (b) transferring said diagnostic files from said first memory to a second memory;
    (c) addressing one of said diagnostic files in said second memory to recall data contained in the addressed file;
    (d) sending dialing information to said network according to the recalled remote computer's telephone number to cause the network to establish a first path to the remote computer identified by said recalled identification;
    (e) applying a test signal according to the recalled diagnostic command to said first path to detect a response from the identified remote computer and detecting whether there is a match or a mismatch between said response and the recalled expectation value;
    (f) if said match is detected, releasing said first connection and repeating the steps (c) to (e);
    (g) if said mismatch is detected, releasing said first path and sending dialing information to said network according to the recalled administrator's telephone number to cause the network to establish a second path to said administrator's station; and
    (h) transmitting contents of said mismatch and said recalled remote computer's identification to said administrator's station through said second path.

* * * * *